2,780,538
FUEL UTILIZATION PROCESS

Ernest G. Chilton, Orinda, Calif., assignor to Shell Development Company, New York, N. Y., a corporation of Delaware No Drawing. Application January 29, 1954,
Serial No. 407,170

7 Claims. (Cl. 75—43)

The present invention relates to the operation of furnaces in which fluid fuels are burned. More particularly, it is concerned with a method of improving and controlling the radiant heat or emissivity of flames produced in furnaces.

In many types of furnaces wherein the fuel burned is oil, gas, or mixtures thereof, at least a part of the heat released by the flame is transferred from the flame to the body being heated by means of radiation. This either occurs directly, as in the case of a solid charge, or indirectly, as in the case of a liquid charge. Open hearth steel furnaces, lime and cement kilns, annealing furnaces, tube still heaters, cracking furnaces, and the like are examples of many types of furnaces largely dependent upon radiant heat transfer. The present invention is especially directed to the operation of open hearth furnaces in steel making processes, but the principles and process apply to these other types of furnaces as well.

In all of such types of furnaces, the proportion of heat transferred to the charge by radiation is largely fixed by the design of the furnace and by the characteristics of the flame. For example, in an open hearth furnace nearly all of the heat is transferred to the charge by radiation. In the usual case of a tube still heater or kiln to which the charge is continuously fed at a constant temperature and rate, the proportion of radiant heat transfer depends upon the ratio of the tube surface area which the flame "sees" to the tube surface area which is in contact with the combustion gases, but which the flame cannot "see." As long as outlet temperatures must remain constant at a predetermined value, which is almost always true, the heat adsorption profile of the charge within the furnace has not heretofore been a variable, once a particular furnace design is selected and a particular fuel utilized.

Industrial furnaces are ordinarily extremely large capital investments and it is obvious that increased flexibility in the operation of such furnaces would be highly advantageous.

It is an object of the present invention to provide a method of controlling the radiation effects within furnaces. It is a more particular object of this invention to provide increased flexibility in the radiation effects of flames burning in furnaces. It is a further object of the invention to improve the economic aspects of operating such furnaces. Other objects will appear hereinafter.

Now, in accordance with the present invention, it has been found that the radiation or emissivity of a flame being burned in a furnace may be controlled by variable injection into the fuel stream substantially immediately before combustion in the furnace of a concentrated suspension of carbon black. (The term "immediately" will be understood in this case to mean that the carbon black is suspended in the proportions as burned for no more than a short time, i. e., less than one hour, and preferably less than one minute.) More particularly, it has been found that the injection of carbon black concentrates into the fuel stream can be made when maximum heat transfer by means of radiation is desired; and, at stages where heat requirements are diminished, the injection of carbon black into the fuel stream may be decreased or omitted entirely. Still more particularly, a specific application of the present invention comprises operation of an open hearth furnace for the purpose of steel manufacture wherein a concentrate of carbon black is injected into a fuel stream immediately prior to combustion thereof within the open hearth furnace and during the charging and melting stages of the steel manufacture. During the refining stage, wherein no heat elevation is required but temperature maintenance is necessary, the carbon black injection may be reduced or entirely stopped.

A further improvement in the present invention especially as applied to situations such as exist in open hearth steel making furnaces, comprises maintaining the flame profile substantially constant during the entire steel making process, and varying the radiation of the flame by controlling the carbon black injection into the fuel stream immediately prior to combustion. A still further improvement in this respect comprises maintaining the total fuel input substantially constant throughout the steel making process, thus maintaining the flame profile substantially unaltered during the same period, but varying the radiation characteristics thereof by variation in carbon black injection.

The open hearth furnace is a batch furnace. Steel scrap, pig iron, and sometimes a small proportion of ore are charged to the furnace, melted and refined. In the first stage of the melt, the "charging period," the solids are cold and present an irregular surface to the flame and combustion gases. The actual charge to the furnace is normally carried out in a series of steps since the unmelted mass usually is too large for the entire charge to be made at one time. Consequently, substantially half of the charge is inserted in the furnace and partially or fully melted before further portions of the charge are added. Upon commencement of heating at least a proportion of the charge melts sufficiently to substantially submerge the remaining solids and the surface of the charge becomes flat. When this stage has been reached, the so-called "melting period" begins. When the ingredients have all reached the melt stage (or substantially so), the "refining period" starts, during which the liquid charge is maintained at a high and substantially constant temperature for the necessary time to complete its purification by separation of the slag from the main body of the melted steel.

It is economically desirable to minimize the time consumed during the charging and melting periods in order to maintain a high rate of production of steel from the furnace. During these first two periods (charging and melting) the temperature is being raised continually and, consequently, during this time the maximum degree of radiation from the flame is desirable. The maximum fuel input rate is limited by the melting temperature of the roof of the furnace as well as the optimum flame profile for efficient transfer of heat from the flame to the melting charge. During the charging period high fuel input rates may be employed when both the charge and the furnace refractory roof are relatively cool. However, during the melting period, the fuel input rate is limited by the maximum allowable temperature of the refractory roof which is ordinarily in the order of 2800–3000° F. Since the temperature of the charge during this period gradually rises from 2400 to 2600° F., there is a very small margin between required and maximum allowable furnace temperatures.

While the fuel input rate can be varied, it will be obvious that the flame profile will alter radically with any change made in this input rate. Hence, it is desirable to establish the optimum flame profile for a given rate of fuel input and thereafter maintain the same rate of total fuel consumption. The present process is based upon these considerations and provides the flexibility necessary for successful operation thereof.

Fuels have been modified in the past by the incorporation of carbon blacks or of other solid fuel materials, especially powdered coal. However, the use of powdered coal in fuel oil suspension does not provide the desired increase in radiant heat, since the powdered coal particles are relatively extremely coarse and consequently do not present the surface area necessary for optimum black body radiation. Carbon blacks, when used as proposed heretofore, have been incorporated in the entire body of the fuel oil and consequently permitted no latitude in the alteration of the radiation of the flame which must necessarily have remained at a constant value for any total rate of fuel input. Moreover, the principal disadvantage which was experienced with these prior art coal and carbon black fuel oil suspensions comprised the difficulty of maintenance of the suspension, since in the relatively dilute form in which they are normally employed the particles are not self-supporting and tend to settle out. This property may be overcome in part by incorporation of certain suspending agents and surfactants, but this is an uneconomical means of creating and maintaining the suspensions and also entails certain problems such as the creation of undesirable ash. Since the fuel input into a large furnace such as an open hearth furnace is extremely high, the ash problem becomes serious due to deposition thereof on the sides of the furnace and on the operating parts thereof. Concentrates of carbon blacks have been prepared but have been employed in the preparation of printing inks and the like. This, of course, has no relationship to the operation of furnaces such as are considered here.

THE CARBON BLACK CONCENTRATES

The concentrates of carbon black (or other solid particle) to be injected in the fuel stream immediately prior to combustion may comprise from about 10% to about 65% by weight of carbon black and preferably contain between about 25% and 50% by weight thereof. The suspending fluid may comprise water or, more preferably, an organic liquid which is capable of combustion. More preferably still, the organic liquid is not only capable of being burned, but also is miscible with or identical with the main body of the fuel burned in the furnace operation. Still more preferably, the fluid suspending medium is a liquid which is mobile at ordinary ground or room temperatures, but which has a sufficiently high flash point or boiling point so that it may be handled without undue danger during the preparation of the concentrate and the utilization of the latter. More specifically, the liquid suspending medium preferably has a relatively low viscosity between about 1 and about 200 centistokes at 100° F. and an initial boiling point above about 100° F. Suitable materials falling within this range include especially gas oil, either straight run or cracked, kerosene, and fuel oils which may be either distillates or light residues.

The carbon blacks utilized in these concentrates and in the operation of the process of the present invention are preferably those presenting a maximum exposed surface area so that the greatest radiation may be caused by their burning. Thus, it will be seen that relatively coarse materials, namely, solid fuel particles having average particle diameters greater than about 2 microns, will not be desirable for use in the present process, although the actual steps of the process may be employed in their consumption if their radiation effect is not of primary importance. Preferably, the carbon blacks employed have average particle diameters less than about 1 micron and preferably between about 0.02 and about 0.8 micron.

While the process of preparing the carbon black concentrates may be varied, the most convenient means comprises milling in a ball mill type of apparatus at least part of the suspending fluid and the carbon black, until the surfaces of the latter are thoroughly wetted by the suspending fluid. It has been found that this does not readily occur at room temperature. Consequently, it is a preferred practice to subject the suspending fluid and carbon black to a milling action at a temperature between about 85° F. and about 210° F. during a substantial portion of the milling and at least until a stable suspension of the carbon black in the suspending fluid is obtained.

The proportion of carbon black which may be incorporated in the suspending medium will depend in part upon the characteristics of the carbon black and especially upon the particle size thereof. As the average particle size becomes smaller, the tendency of the composition to gel becomes greater. Hence, the limiting concentration is reached beyond which substantial solid compositions result. Since a comparable composition is highly desirable for the present process, this becomes a limiting factor upon the preparation of a carbon black concentrate unless means are taken to overcome the gelling property. With the more relatively coarse carbon blacks no auxiliary means are required for the preparation of concentrates even up to 50–65% by weight of carbon black.

The carbon blacks which may be employed in the process include such materials as furnace blacks and channel blacks, the former being characterized by generally smaller surface areas and larger particle sizes than the latter. Furnace black surface areas range from about 3 to about 82 square meters per gram, equivalent to about 0.4 to 0.5 micron average particle diameter. On the other hand, channel blacks range from about 100 to about 200 square meters per gram, equivalent to 0.2–0.4 micron average particle diameter. These blacks are known in the trade under other names, such as channel black, acetylene black, lamp black, and thermal blacks. Mixtures of the blacks may be obtained in order to modify the gelling properties of the carbon black concentrates. Thus, between about 10% and about 35% by weight of relatively coarse, e. g., greater than about 1 micron average particle diameter and between about 65% and about 90% by weight of relatively fine particles, e. g., less than 0.4 micron diameter, may be mixed to obtain a modified suspension having a viscosity substantially lower than if a single average particle size material had been employed. In fact, in many cases, it will be found that the mixtures actually have viscosities substantially lower than the viscosity of a suspension of either variety of the carbon black material employed alone in the suspending fluid. The possibility exists, of course, of combining other powdered fuels with the highly divided carbon blacks for the principal purpose of reducing the suspension viscosity thereof, even though the resulting suspensions do not have the maximum radiation properties when injected into fuel oils immediately prior to combustion. Powdered coal or peat or the like may be employed for this purpose, although mixtures of varying sizes of carbon blacks are more to be desired due to their optimum radiation properties. The best results are obtained when the ratio of the average particle sizes of the two carbon blacks (or carbon black plus powdered coal, etc.) is within the range of 1:15 to 1:300, and the average particle sizes of the two powders are within the range from about 0.05 micron to about 30 microns. Solid particles which may be employed to augment the emissivity of the furnace flames may be either inorganic or organic and may be combustible (or which at least is volatilized and disposable in the furnace stack gases). The essential character comprises the possession of a sufficient surface area (at least 3 square meters per gram) to effectively increase flame emissivity, which, for roughly spherical bodies means a maximum particle diameter of about 1 micron. While carbon blacks comprise the ideal material for the contemplated purpose (due to ease of preparation, availability, cost, particle size and combustibility), other materials may be used such as powdered coke or coal, wood flour, powdered asphalts and asphaltites, powdered resins (such as the petroleum hydrocarbon-insoluble pine wood resin); and powdered petroleum resins obtained from extraction of certain crude oil fractions.

Another means of reducing the viscosity of the carbon black suspensions is by the addition of detergent materials. These include especially the oil-soluble sulfonates and the class of high molecular weight oil-soluble organic compounds having a linear hydrocarbon chain and containing a plurality of substituent polar and nonpolar groups uniformly or randomly attached to this hydrocarbon chain. The latter class of materials are fully described in copending application to Bondi et al., Serial No. 357,374, filed May 25, 1953.

The compounds to be used in accordance with the invention are suitably prepared as hydrolyzed or alcoholized copolymers of alpha-olefinic hydrocarbons (such as alpha-alkenes) containing from 8 to about 40 carbon atoms with hydrolyzable vinyl compounds such as vinyl halides, e. g., vinyl chloride, and vinyl esters, e. g., vinyl acetate. One of the essential reactants in the formation of the polymeric compounds is an alpha-olefin (normal or branched chain) containing at least 8 carbon atoms. These alpha-olefins have from 8 to 40 carbon atoms, the alpha-olefins containing from 12 to 30 carbon atoms being preferred. Illustrative of such olefins are octene, nonene, decene, dodecene, tetradecene, hexadecene, nonadecene, etc. These olefin materials can be obtained, for example, by cracking paraffin waxes, as is well known in the art. These may be regarded in general as alkane polyols or derivatives thereof and comprise, for example, the hydrolysis product of alpha-octadecene-vinyl acetate copolymer; the hydrolysis product of alpha-hexadecene-vinyl acetate copolymer; the copolymer of alpha-octadecene and acrylonitrile; the copolymer of alpha-octadecene and acrylic acid; and the copolymer of alpha-octadecene and acrylamide.

While the above type of polymeric materials is preferred for reducing the viscosity of the carbon black concentrates (since they do not leave any ash after their combustion), other detergent substances may be employed in place of or in addition to those already listed. These include especially oleophilic sulfonates, which can be neutral and/or basic oil-soluble sulfonates derived from any suitable material and prepared by any of the well known suitable methods. Preferred materials for making oil-soluble sulfonates include petroleum fractions, alkyl-substituted aromatic compounds, and alkyl-substituted polar compounds containing aromatic substituents. The petroleum sulfonates suitable for use in compositions of this invention are described in U. S. Patents 2,280,419; 2,344,988; 2,509,863; 2,523,582; and 2,585,520. If desired, the sulfonates can be purified by methods described in U. S. Patent 2,488,721. Although various metal sulfonates are contemplated for the present use, including alkali metal sulfonates, alkaline earth metal sulfonates, and other polyvalent metal sulfonates, the sulfonates of the metals of group II of the periodic table and having an atomic number from 12 to 56 are preferred and especially the alkaline earth metals within that group. Specific sulfonates which are particularly suitable for use in compositions of this invention include oil-soluble metal sulfonates, such as sodium, potassium, lithium, calcium, barium, magnesium, zinc, and aluminum petroleum sulfonates, tetra-tertiary-butyl naphthalene sulfonate, diwax benzene sulfonate, stearyl benzene sulfonate, diwax naphthalene sulfonate, and mixtures thereof.

The sulfonates may be the sole viscosity reducing agent present or may be combined with certain phenates, such as those described in U. S. 2,410,652; 2,501,991; and 2,610,982. Specifically, they can be simple phenates, such as metal alkyl phenates (calcium cetyl phenate), polar-substituted simple phenates (calcium or zinc alkyl salicylate), or polyphenates. These include the alkali metal or alkaline earth metal cetyl phenates, dibuty phenate, octylthiophenates, cyclohexyl phenates, etc.

When the carbon black average particle diameter is less than 0.5 micron, the detergents are ordinarily employed in amounts between about 1% and about 20% based on the weight of the carbon black; however, larger or smaller amounts may also be used, and may, in some cases, be found to be preferred.

The carbon black concentrates, as indicated hereinbefore, are to be injected into the fuel stream substantially immediately before combustion thereof in the combustion chamber of the subject furnaces. The principal body of fuel burned in such furnaces ranges all the way from heavy residual fuels to gases and mixtures of such materials. The fluid fuels therefore comprise residual fuels, such as straight run and cracked distillation or flashing bottoms; distillates, such as straight run gas oil, light and heavy catalytically cracked gas oils, thermally cracked gas oil, thermal and catalytic reforming bottoms, kerosene, and the various natural and refinery gases employed for heating such furnaces.

Under ordinary conditions of operation it is preferred to inject from about 0.5% to about 7.5% by weight of carbon black based on the total fuel being burned in the furnace during those periods when increased radiation of the burning flame is desired. This corresponds roughly on a B. t. u. basis to 0.5–7 pounds of carbon black per 2000 standard cubic feet of gaseous fuel. Details of furnace operation other than the injection of the subject carbon black concentrates into the fuel stream do not form a part of the present invention. Such well known alternatives in the art of furnace operation may be employed as mixing oil with gas as the main body of fuel, the simultaneous use of gas and oil in separately burning or mixture of flames, and the injection of compressed air or steam for the purpose of atomizing the fuel as it is introduced into the combustion chamber.

Injection of the carbon black concentrate into the fuel stream is a simple matter. The concentrate, preferably heated to a temperature between about 50 and about 90° C., is injected into the main fuel stream preferably just ahead of the furnace oil meter. Therefore, the meter registers the sum of the two flows, and preferably this total is maintained constant throughout the entire operation by an automatic oil flow controller, although the proportion of concentrate to main fuel stream may be varied within wide limits during this period. Preferably the concentrate is heated for easy pumping and use of a temperature approximating that of the main fuel is desirable for the purpose of accurate metering.

By utilization of the present process of incorporating concentrates of carbon black into the fuel stream of such furnaces, it has been found that great economic advantages can be obtained, for example, in the cycle time for the production of steel. By the incorporation of 1.5–5% carbon black into the fuel oil utilized for the heating of an open hearth furnace, for example, during the charging and melting stages but omitted during the refining stage, a 10% reduction in total cycle time was effected. By maintaining the total fuel input constant during the entire period of steel production (or during any other comparable process such as cement production) the flame profile was substantially unaltered, but the radiation thereof was radically changed by the injection or omission of the carbon black concentrate. The increased flame luminosity did not appear to affect refractory life in such furnaces since the temperature of the flame was not substantially different from that of the flame without carbon addition. The following examples illustrate the process of the present invention.

*Example I*

A carbon black concentrate was prepared by ball milling equal weights of a light residual fuel oil and a thermal black having particle diameters between 0.4–0.7 (average 0.5) micron. The ball milling was carried out at a temperature between about 100° F. and about 200°

F. The fuel oil used in making the concentrate and also as the main fuel had the following properties:

| | |
|---|---|
| Unblended thermal residue percent | 44 |
| Lube oil extract do | 37 |
| Cutter stock do | 19 |
| Gravity, °API | 11.4 |
| Flash, PM, °F | 204 |
| Viscosity, SUS, at 100° F | 509 |
| Viscosity, SUS, at 122° F | 26.3 |
| Pour point, °F | −10 |
| Sulfur, percent | 0.93 |

A tank of a concentrate was heated to a temperature of about 180° F. by means of a steam coil and stirred to maintain uniformity while injection into the fuel line immediately ahead of the furnace oil meter. Ninety pounds of air per square inch were employed for atomizing the total fuel charge. The total fuel (including carbon) rate was 5 gallons per minute and the carbon black-fuel oil concentrate was injected at a rate of 4 pounds/minute. A total steel charge of about 76 tons was utilized, about one-half of the amount (heavy melting scrap) being charged initially with two nearly equal further charges added subsequently after partial melting of the first portion of the charge. The first supplementary addition comprised heavy melting scrap and light melting scrap while the final addition to the charge comprised 12½ tons of cast iron and light melting scrap. Parallel runs were made utilizing carbon black injection in one run during the charging and melting stages and omitting carbon black injection during the refining stage while the second run did not include carbon black injection during any stage. The data which follow show a comparison of these two runs.

| Type of Run | No carbon | 5% carbon |
|---|---|---|
| Charge tons | 75.9 | 76.0 |
| Product do | 68.1 | 72.8 |
| Time until substantially level minutes | 318 | 266 |
| Time until lime boil do | 328 | 276 |
| Charge to tap time do | 503 | 390 |
| Total carbon injection time do | | 294 |

*Example II*

A carbon black suspension is prepared by ball milling carbon black having average particle diameters of 0.2–0.4 micron with straight run gas oil to produce a 50% concentrate, the concentrate also containing 8% (based on the carbon black) of neutral sodium petroleum sulfonate. In the absence of the sulfonate, it was found that a substantially dry composition was prepared, while the addition of the sulfonate resulted in the formation of a fluid concentrated carbon black mixture. This concentrate can be injected into a residual fuel oil stream as described in Example I utilizing in the order of 2.5% carbon black based on the total fuel mixture, and utilizing air to atomize the fuel. By this means a substantial reduction in charge-to-tap time can be effected.

*Example III*

The concentrate prepared as described in Example I is injected into the fuel oil stream together with high pressure air for the purpose of atomization in an amount to give a final carbon black concentration of 1.5% based on the total fuel mixture. This causes a substantial reduction in the cycle time for steel production.

I claim as my invention:

1. In the process of operating an open hearth steel furnace, wherein the process of charging the steel ingredients, melting the latter and purifying the molten steel is attended by heating with a fluid fuel flame, the improvement comprising injecting a carbon black fuel oil concentrate having a carbon black content between about 10% and about 65% by weight, the carbon black particles having an average diameter between about 0.02 micron to about 1.0 micron, into a fuel oil immediately prior to combustion thereof in the combustion chamber of said furnace, the injection being continued during the charging and melting stages and omitted during the refining stage of said steel-making process.

2. A process according to claim 1 wherein the flame profile of the burning fuel components is maintained substantially constant by maintaining the total fuel burning rate substantially constant throughout the steel-making process within the furnace.

3. In a heating process wherein a fluid fuel is burned in a furnace to produce a flame, and wherein a relatively high heat input to a charge is desired in a first sequential heating stage and a relatively low heat input to the charge is desired in a second sequential heating stage, the improvement comprising adjusting the heat input accordingly by injection into the fuel stream, immediately prior to combustion, a concentrate comprising a suspension of carbon black in a fuel oil during the first heating stage and omitting said injection in the second heating stage, and at the same time providing a substantially constant flame profile throughout both heating stages by maintaining a substantially constant total fuel burning rate throughout both heating stages.

4. A process of fuel utilization which comprises injecting into a fluid fuel stream immediately prior to the burning thereof in a furnace to produce a flame, a concentrate comprising a stable mobile suspension of carbon black in fuel oil containing from about 10% to about 65% by weight carbon black with an average particle diameter of from 0.01 to about 1.0 micron, said suspension being prepared by grinding a mixture of carbon black and fuel oil in a mill of the ball mill type at a temperature of from about 85° F. to about 210° F., the rate of injecting being sufficient to substantially increase the emissivity of said flame, whereby the flame emissivity and its heating effect are increased.

5. A process according to claim 3 wherein the concentrate comprises a stable mobile suspension of carbon black in fuel oil containing from about 10% to about 65% by weight carbon black of an average particle diameter of from about 0.4 micron to about 0.7 micron, said suspension being prepared by grinding a mixture of carbon black of the thermal black type and fuel oil in a mill of the ball mill type at a temperature of from about 85° F. to about 210° F.

6. A process according to claim 1 wherein the carbon black fuel oil concentrate is a stable mobile suspension containing from about 10% to about 65% by weight carbon black of an average particle diameter of from about 0.4 micron to about 0.7 micron, said suspension being prepared by grinding a mixture of carbon black of the thermal black type and fuel oil in a mill of the ball mill type at a temperature of from about 85° F. to about 210° F.

7. A process according to claim 1 wherein the rate of injection of the carbon black fuel oil concentrate during the charging and melting stages is such that the carbon black injected amounts to from about 0.5 to about 7.5% by weight of the total fuel burned in the furnace during the charging and melting stages.

References Cited in the file of this patent

UNITED STATES PATENTS

| | | |
|---|---|---|
| 405,967 | Mason | June 25, 1889 |
| 1,114,767 | Hunt | Oct. 27, 1914 |
| 1,329,967 | Greenstreet | Feb. 3, 1920 |
| 1,390,228 | Bates | Sept. 6, 1921 |
| 1,444,723 | Bates | Feb. 6, 1923 |
| 1,955,589 | Leahy | Apr. 17, 1934 |

FOREIGN PATENTS

| | | |
|---|---|---|
| 165,524 | Great Britain | June 27, 1921 |